(12) United States Patent
Fischman

(10) Patent No.: US 11,071,262 B2
(45) Date of Patent: Jul. 27, 2021

(54) SYSTEM AND METHOD FOR VARIABLE RATE IRRIGATION WIND CONTROL AND COMPENSATION

(71) Applicant: Valmont Industries, Inc., Omaha, NE (US)

(72) Inventor: Kevin K. Fischman, Elkhorn, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/042,395

(22) Filed: Jul. 23, 2018

(65) Prior Publication Data

US 2019/0037786 A1 Feb. 7, 2019

Related U.S. Application Data

(60) Provisional application No. 62/539,753, filed on Aug. 1, 2017.

(51) Int. Cl.
*A01G 25/16* (2006.01)
*A01G 25/09* (2006.01)
*G05B 13/02* (2006.01)

(52) U.S. Cl.
CPC ........... *A01G 25/16* (2013.01); *A01G 25/092* (2013.01); *G05B 13/021* (2013.01)

(58) Field of Classification Search
CPC ..... A01G 25/16; A01G 25/092; Y02P 60/122; Y02A 40/237; Y02A 40/238; G05B 13/021; G05B 2219/2625
See application file for complete search history.

(56) References Cited

U.S. PATENT DOCUMENTS

| 4,072,269 | A | 2/1978 | Berg |
| 5,246,164 | A | 9/1993 | McCann et al. |
| 5,927,603 | A * | 7/1999 | McNabb .............. A01G 25/092 239/63 |
| 6,290,151 | B1 | 9/2001 | Barker et al. |
| 6,947,811 | B2 | 9/2005 | Addink et al. |
| 7,051,952 | B2 | 5/2006 | Drechsel |
| 2006/0027677 | A1 * | 2/2006 | Abts .................... A01G 25/092 239/67 |

(Continued)

FOREIGN PATENT DOCUMENTS

WO 0015987 A1 3/2000

OTHER PUBLICATIONS

NRCS. Sprinkler Irrigation. Part 623 National Engineering Handbook. Aug. 2016. (Year: 2016).*

*Primary Examiner* — Rocio Del Mar Perez-Velez
*Assistant Examiner* — Vi N Tran
(74) *Attorney, Agent, or Firm* — Milligan PC LLO

(57) ABSTRACT

The present invention provides a system and method which combines field mapping and control software to effectively manage sprinkler parameters to adjust for changes in weather conditions and positional/terrain changes. According to a first preferred embodiment, the present invention preferably provides a system which monitors a mapped set of boundaries and preferably receives data regarding a variety of weather factors including wind monitoring (speed, direction, averages, and gusts) and preferably makes adjustments to the system to adjust and modify the shape of a desired distribution area based on the weather factors.

14 Claims, 3 Drawing Sheets

(56) References Cited

U.S. PATENT DOCUMENTS

| | | | |
|---|---|---|---|
| 2006/0116792 A1* | 6/2006 | Addink | A01G 25/16 700/284 |
| 2009/0277506 A1* | 11/2009 | Bradbury | A01G 25/16 137/1 |
| 2010/0032493 A1* | 2/2010 | Abts | A01G 25/092 239/11 |
| 2010/0088077 A1* | 4/2010 | Kisch | A01G 25/16 703/2 |
| 2011/0137827 A1* | 6/2011 | Mason, Sr. | G06Q 10/06 705/413 |
| 2012/0221154 A1 | 8/2012 | Runge | |
| 2013/0008977 A1* | 1/2013 | Pfrenger | A01G 25/092 239/69 |
| 2015/0112494 A1 | 4/2015 | Woytowitz et al. | |
| 2016/0158783 A1* | 6/2016 | Wiebe | A01G 25/16 700/284 |
| 2017/0127625 A1* | 5/2017 | Hattar | A01G 25/16 |
| 2017/0301036 A1* | 10/2017 | West | G06Q 50/01 |
| 2017/0359974 A1* | 12/2017 | Whalley | A01G 25/092 |
| 2017/0359975 A1* | 12/2017 | Reuter | A01G 25/092 |
| 2018/0315100 A1* | 11/2018 | Magnusson | G06Q 30/0283 |
| 2018/0317407 A1* | 11/2018 | Williams | A01G 22/00 |

* cited by examiner

SYSTEM AND METHOD FOR VARIABLE RATE IRRIGATION WIND CONTROL AND COMPENSATION

RELATED APPLICATIONS

The present invention claims priority to U.S. Provisional Application No. 62/539,753 filed Aug. 1, 2017.

BACKGROUND AND FIELD OF THE PRESENT INVENTION

Field of the Present Invention

The present invention relates generally to a system and method for irrigation management and, more particularly, to a system and method which combines field mapping and control software to effectively manage individual sprinkler control on a mechanical irrigation machine.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. With present technology, sprinkler controls are determined and varied based on fixed field design patterns. For each fixed design pattern, the selected nozzles are controlled to irrigate a defined area pattern and they cannot be otherwise controlled or adjusted. This limitation of the prior art creates significant issues in tailoring irrigation patterns to a variety of circumstances. For this reason, large amounts of water and chemicals are wasted each year. For example, during high wind conditions water can drift from the desired application area to other areas. This also results in incorrect application rates for a targeted field which defeats the purpose of individual sprinkler control. Additionally, changes in the elevation of a selected field can also cause water to drift outside of a desired application area.

At present, the prior art provides control modules which are limited to adjusting watering schedules based on rain meters and the like. For example, U.S. Published Application No. US20120221154 to Runge discloses an irrigation control module that can adjust a watering schedule for a connected irrigation controller based on weather data provided by a local weather station. Similarly, U.S. Published Application No. US20100032493 to Abts discloses a method for automatically adjusting the water application rate of an irrigation system which is movable over an agricultural field based on data from environmental sensors and crop or plant sensors. Further, U.S. Pat. No. 6,947,811 to Addink discloses systems and methods in which an irrigation controller is programmed to adjust an irrigation schedule according to a condition of a plant being irrigated.

While helpful, the prior art fails to teach or suggest any system which enables a user to manage and adjust irrigation controls using field mapping, topography and detected weather conditions. Further, the prior art fails to teach or suggest the use of field mapping and control software to effectively manage individual sprinklers based on current wind conditions. At present, the chosen method for adjusting to high wind conditions is often simply shutting down watering operations.

In order to overcome the limitations of the prior art, a system is needed which is able to combine field mapping and control software to effectively manage individual sprinkler functions in a variety of different conditions.

SUMMARY OF THE PRESENT INVENTION

To address the shortcomings presented in the prior art, the present invention provides a system and method which combines field mapping and control software to monitor machine location and angles in coordination with a field specific program. According to a first preferred embodiment, the controller of the present invention preferably controls a variable rate irrigation system including control of individual sprinklers. According to a further preferred embodiment, the controller of the present invention preferably monitors wind speeds and makes adjustments to the water system based on the monitored wind speeds. Preferably, these adjustments may include determining the operation rate of a variable rate pump as well as turning selected sprinklers on or off in adjusted locations or entirely. According to a further preferred embodiment, a controller in accordance with the present invention may further preferably make adjustments to a predesigned irrigation course (including the speed or path of an irrigation machine) based on detected weather and topographical conditions.

According to a further preferred embodiment, the controller of the present invention may preferably further operate to adjust the irrigation pattern, valves, sprinklers, and other aspects of the system to create a corrected distribution pattern which will result in reduced product loss. According to a still further aspect of the present invention, the controller of the present invention may preferably further create a corrected distribution pattern by use of additional factors such as: distribution droplet size, height of nozzle from the ground, nozzle direction, direction and speed of the irrigation machine, and the slope of a given field and other detected conditions. According to a still further preferred embodiment, the controller of the present invention preferably may selectively adjust individual sprinklers or sets of sprinklers so that groups of sprinklers may be turned on or off or run at reduced water pressures depending on detected conditions.

According to a further preferred embodiment, the present invention may preferably monitor a mapped set of boundaries and receive data regarding a variety of weather factors including wind monitoring (speed, direction, averages, and gusts) and preferably may make adjustments to the system (i.e. water pressure, sprinkler parameters and/or system travel speed) to adjust and modify the shape of a desired distribution area. According to a further preferred embodiment, the controller of the present invention may preferably be integrated into the control system of an irrigation machine so that it may control any or all aspects of the irrigation machine including but not limited to: pumps, valves, sprinklers, variable rate irrigation, water pressure, shape of distribution pattern, rate of travel and the like.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
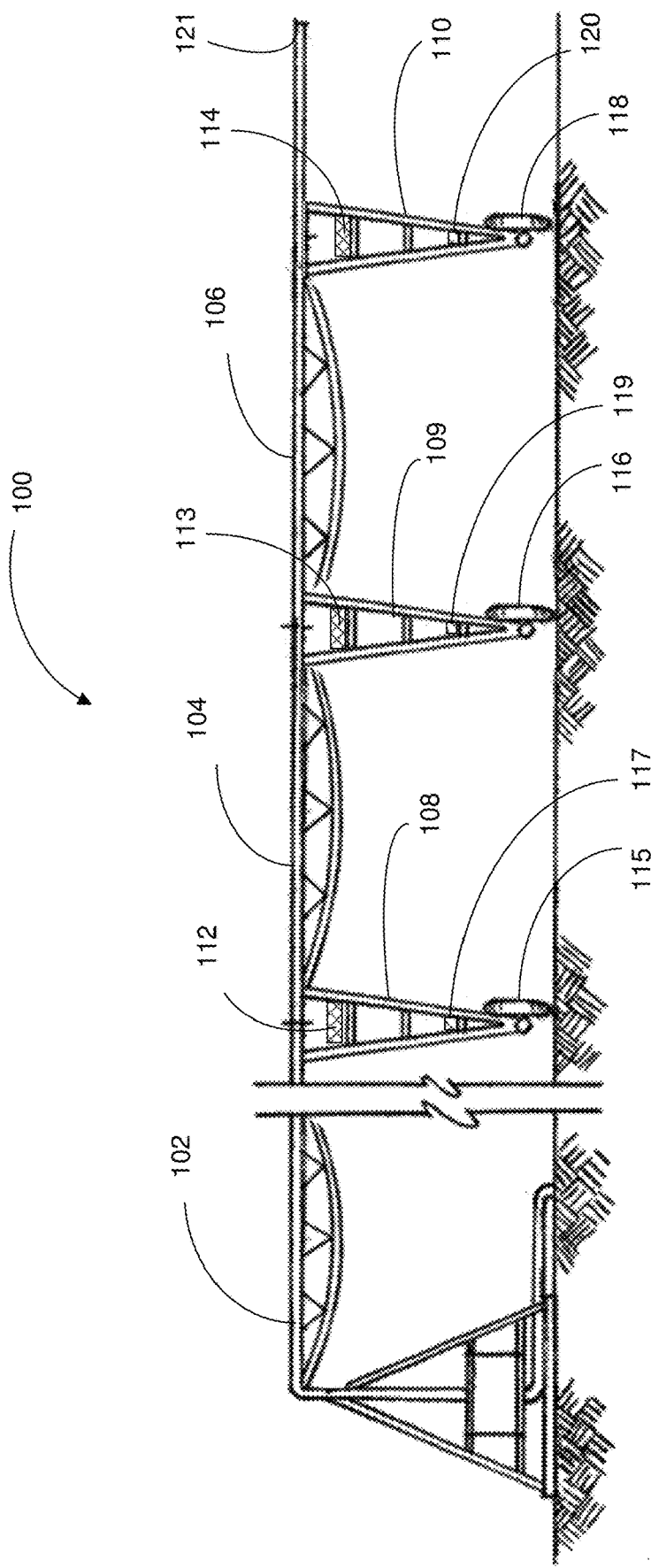
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), mixed analog and digital, and the like.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; stationary systems; corner systems) may be used with the present invention without limitation.

With reference now to FIG. 1, an exemplary self-propelled irrigation system 100 preferably may include spans 102, 104, 106 supporting drive towers 108, 109, 110. Further, each drive tower 108, 109, 110 is shown with respective drive controllers 112, 113, 114. For each drive tower, 108, 109, 110, the respective drive controllers 112, 113, 114 may generally control respective drive motors 117, 119, 120 and drive wheels 115, 116, 118. Further, such irrigation machines 100 may generally include an extension/overhang 121 which may include an end gun (not shown).

Figure 2:
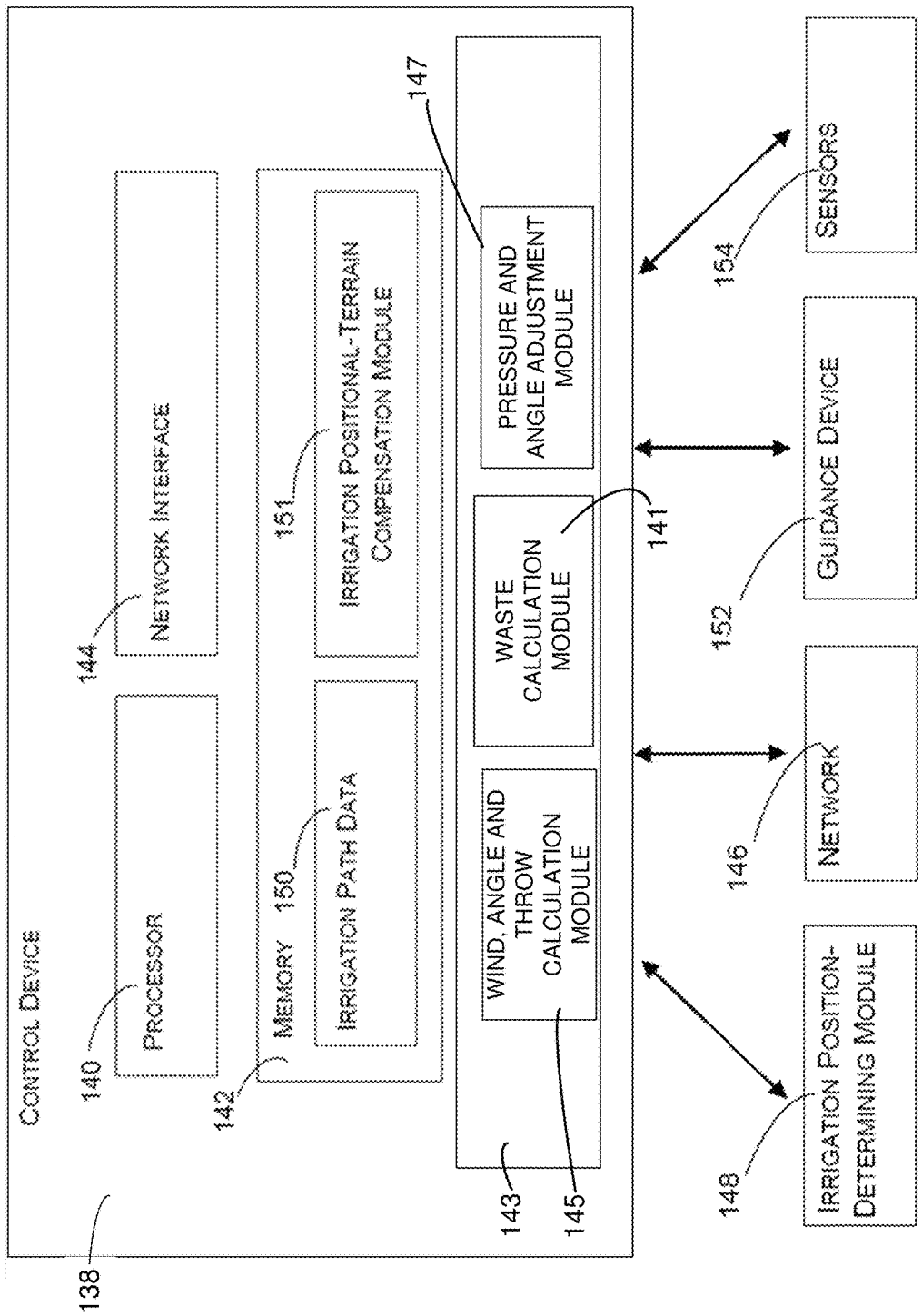
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, an exemplary control device 138 in accordance with the present invention may preferably include a processor 140, a memory 142, one or more modules 150, 151, 143 and a network interface 144 to communicate with one or more networks 146. As further shown, the memory 142 of the exemplary control device 138 may preferably further include a module containing irrigation path data 150 which may further include water application rates, vehicle speed and motor operations data, as well as adjustment data produced, calculated and stored by the various modules of the present invention. For example, such data may include data from the Throw Calculation Module 145, the Waste Calculation Module 141, the Pressure and Angle Adjustment Module 147 and other data sources as discussed in more detail below.

Preferably, the processor 140 of the present invention provides processing functionality for the control device 138 and may include any number of processors, micro-controllers, or other processing systems. The processor 140 may execute one or more software programs that implement techniques described herein. The memory 142 is preferably an example of tangible computer-readable media that provides storage functionality to store software programs, code segments and various data associated with the operation of the control device 138, the processor 140 and other elements of the disclosed system and to perform the steps described herein. The memory 142 may include, for example, removable and non-removable memory elements such as RAM, ROM, Flash (e.g., SD Card, mini-SD card, micro-SD Card), magnetic, optical, USB memory devices, and so forth. The network interface 144 preferably provides functionality to enable the control device 138 to communicate with one or more networks 146 through a variety of components such as wireless access points, transceivers and so forth, and any associated software employed by these components (e.g., drivers, configuration software, and so on).

In implementations, the irrigation position-determining module 148 may include a global positioning system (GPS) receiver or the like to calculate a location of the irrigation system 100. Further, the control device 138 may be coupled to a guidance device or similar system 152 of the irrigation system 100 (e.g., steering assembly or steering mechanism) to control movement of the irrigation system 100. As shown, the control device 138 may further include a positional-terrain compensation module 151 to assist in controlling the movement and locational awareness of the system. Further, the control device 138 may preferably further include multiple inputs and outputs to receive data from sensors 154 and monitoring devices as discussed further below.

As further shown, a preferred embodiment of the present invention may preferably further include: a Wind, Angle and Throw Calculation Module 145 ("Throw Module" 145); a Waste Calculation Module 141 and a Pressure and Angle Adjustment Module 147 ("Adjustment Module" 147). According to a preferred embodiment of the present invention, the Throw Module 145 preferably receives field mapping data, water pressure and weather data which may preferably include wind speed, wind direction, humidity and barometric pressure from the sensor systems as discussed further below. From these data inputs, the Throw Module 145 preferably calculates the length of the throw (alternatively referred to as the "throw" or "reach") for one or more of the sprinklers of the system (i.e. sprayers, nozzles, end guns and the like) for a range of water pressures and settings/parameters (defined herein to include angles of travel, trajectory, nozzle/sprinkler settings and the like) which each sprinkler may be programmed to execute. Preferably, the Throw Module 145 is programmed to receive continual updates of both weather conditions and water pressure levels so that it may dynamically calculate and update throw calculations in real-time as the irrigation system executes a given watering plan. Further in accordance with aspects of the present invention, the Throw Module 145 may preferably be programmed to receive: irrigation map data (i.e. GPS dimensions of a given field); weather data (including humidity, temperature, wind speed and direction); movement data (including speed and direction of the irrigation machine); and topographical data (including data regarding the slope of the terrain to be irrigated).

According to a further preferred embodiment, the Throw Module 145 preferably may continually feed the results of its calculations to Adjustment Module 147. Such calculations may further include factors and inputs such as: safety zones, guidance tower speed, max ET ratio, minimum Arc Radius, full or partial circle, max/min trajectories, start/end angles and the like.

According to a further preferred embodiment, the Adjustment Module 147 may preferably be linked to the control systems (i.e. transducers 326, 328, 329 discussed further below) to control and regulate water pressure including being linked to any pressure boosting systems. Further, the Adjustment Module 147 may preferably be further linked to systems which control and adjust sprinkler settings/parameters. Additionally, the Adjustment Module 147 may preferably be further linked to and receive positioning information from the irrigation positioning module 148 and other mapping systems so that the Adjustment Module 147 may calculate the optimal throw settings desired for each sprinkler. Preferably, based on the dynamically updated throw calculations from the Throw Module 145, the Adjustment Module 147 may preferably independently and dynamically adjust the water pressure and/or sprinkler settings/parameters (including angles of travel, trajectory and nozzle/sprinkler settings) so that the output from each sprinkler stays within the boundaries of the given area to be irrigated.

According to further aspects of the present invention, as the irrigation system is executing an irrigation plan to apply water within a given set of boundaries, Adjustment Module 147 may preferably receive instantaneous updates regarding the reach of each sprinkler and make adjustments accordingly. For example, on a windy day Adjustment Module 147 may increase water pressure (and/or change the sprinkler settings/parameters) when a sprinkler is projecting water against the wind direction. Alternatively, the Adjustment Module 147 may operate to decrease water pressure (and/or change the sprinkler settings/parameters) when a sprinkler of the system is projecting water with the direction of the wind. According to a further preferred embodiment, Adjustment Module 147 may preferably likewise take into account changes in the mapped boundaries and location of the irrigation system as it moves to adjust the throw pattern of the sprinkler.

In operation, the Throw Calculation Module 145 preferably receives data regarding irrigation map data (i.e. dimensions of a given field); weather data (including humidity, temperature, wind speed and direction); movement data (including speed and direction of the irrigation machine); and topographical data (including data regarding the slope of the terrain to be irrigated). Preferably, such data includes the GPS coordinates (or the like) which define the area to be irrigated as well as the irrigation plan for directing water (or other applicant) to the area. Using the irrigation map data, the weather data, the topographic data, and the travel data, the Throw Calculation Module 145 preferably may determine a corrected irrigation plan which includes selected system adjustments to target an applicant(s) onto the designated irrigation area. As discussed above, these selected adjustments, may preferably include: increase/decrease of water pressure; changes to sprinkler settings/parameters; adjustments to the changes in the travel speed and direction and the like.

With further reference to FIG. 2, the system of the present invention may preferably further include a Waste Module 141 which preferably calculates the amount of wasted and/or over-applied applicant expected from both the original irrigation plan and the corrected irrigation plan. Further, the Waste Module 141 preferably is further configured to provide a calculation of the different energy/fuel costs expected in executing the original irrigation plan and the corrected irrigation plan. Preferably, these comparisons may be used by the processor 140 to determine whether to make corrections to the original irrigation plan. Alternatively, the comparisons calculated by the Waste Module 141 may be presented and displayed to the operator to make determinations regarding which irrigation plan to execute. According to a further preferred embodiment, the Waste Module 141 may further provide additional individual calculations of the expected applicant waste and energy/fuel costs for individual adjustments to the original irrigation plan which may preferably be individually selected or declined by the operator.

Figure 3:
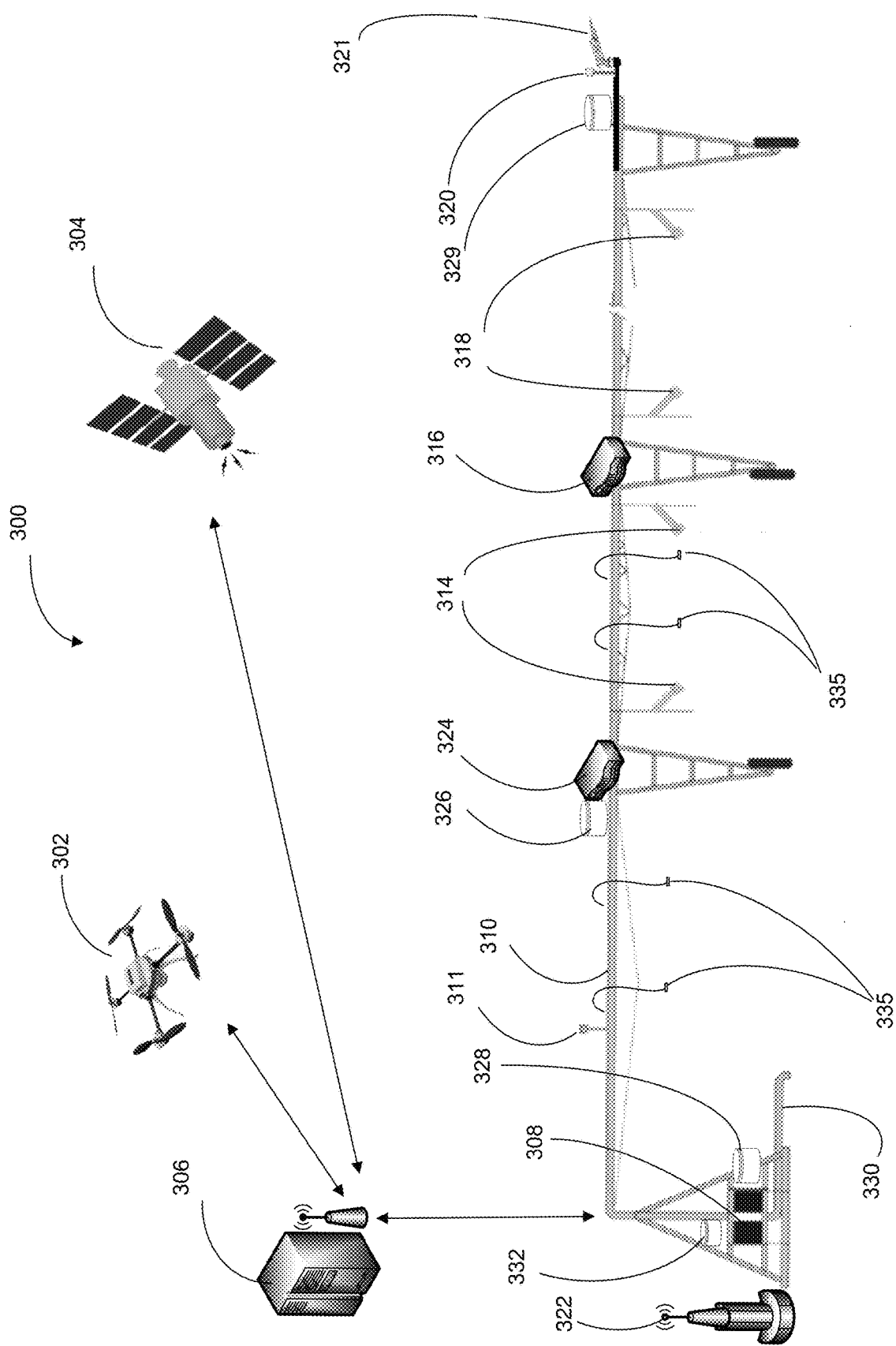
FIG. 3 shows a block diagram in accordance with further preferred embodiment of the present invention.

With reference now to FIG. 3, an exemplary system incorporating aspects of the present invention shall now be further discussed. As shown, an exemplary irrigation system may include transducers 326, 328, 329 which control and regulate water pressure to sprinklers including the end gun 321 and other sprinkler heads 335. Further the system may preferably include drive units 316, 324 which are preferably programmed to monitor and control portions of the irrigation unit drive system. Further, the system of the present invention may preferably further include elements such as a GPS receiver 320 for receiving positional data and a flow meter 332 for monitoring water flow in the system. Still further, a system of the present invention may further include indirect crop sensors 314, 318 which preferably may include moisture sensors to determine the moisture levels in a given area of soil. Additionally, the sensors 314, 318 may further include optics to allow for the detection of crop type, stage of grown, health, presence of disease, rate of growth and the like. Still further, the system may include ground sensors 330. Still further, the detection system may further include a weather station 322 or the like which is able to measure weather features such as humidity, wind speed, wind direction, pressure, precipitation, temperature and the like. Still further, the system may preferably further include a wireless transceiver/router 311 for receiving and transmitting signals between system elements.

In operation, the system of the present invention may also preferably calculate and adjust the movement of the irrigation drive system to compensate for changes in the throw/distribution patterns calculated from the weather data and/or positional information. For example, the irrigation system of the present invention may preferably calculate and execute a first water distribution and/or travel pattern based on a first detected set of weather data and/or field dimensions. Thereafter, based on updated weather data and/or field dimensions, the system may make adjustments to the first water distribution/travel pattern to create a second water distribution and/or travel pattern. Accordingly, the system may determine to travel closer to or further from a first boundary based on detected weather conditions such as a given wind pattern (i.e. speed and/or direction). Further, as discussed further herein, the system of the present invention may change the water distribution pattern by controlling and changing the parameters of individual sprinklers alone or in conjunction with other irrigation system parameters. Still further, the system of the present invention may simultaneously change multiple parameters of the irrigation system including the water pressure, travel speed, travel pattern and/or endgun settings/parameters to create a desired water distribution pattern.

Preferably, the data collected by the detectors and sensors connected to the span 310 are forwarded to a main control panel 308 which preferably includes: a CPU, memory, and processing software to receive and process collected data (including Throw Module 145 as discussed above with respect to FIG. 2), and one or more elements of control device 138 (including the Adjustment Module 147 as discussed above with respect to FIG. 2). According to alternative preferred embodiments, any one of the processes discussed above with respect to the main control panel 308 may alternatively be performed on a remote server 306 with any data and/or control signals transmitted between the main control panel 308 and the remote server 306. Still further, the system may preferably further include a remote sensing element such as a sensor suite located on an unmanned aerial vehicle 302 (UAV), satellite 304 or other high-altitude monitoring system which may preferably provide weather and other data to the remote server 306 and/or to the control panel 308.

As discussed above, the control panel 308 of the present invention preferably may monitor the system location in relation to a mapped set of boundaries in coordination with a field specific program. During operation, the control panel 308 may preferably receive data regarding field dimensions, changes in the irrigation plan/pattern, and/or data regarding weather factors (such as wind speed, direction, averages, and gusts) and preferably makes adjustments to the system (i.e. water pressure, sprinkler settings/parameters, system travel speed/direction) to adjust and modify the shape of the desired distribution area. Accordingly, the control panel 308 may preferably monitor the irrigation program and the location of individual sprinklers to adjust system/sprinkler settings in response to sensor inputs and thereby create a desired distribution pattern/area. According to further preferred embodiment, the system of the present invention may preferably further calculate adjustments to the system based on other factors including: droplet size, applicant type, height of nozzle from the ground, speed of irrigation system travel and the like. Further, the system of the present invention may preferably further adjust a given designed distribution pattern based on additional factors such as: rate of rain fall, pH of rain fall, sunlight levels, rates of temperature change and the like.

While the above descriptions regarding the present invention contain much specificity, these should not be construed as limitations on the scope, but rather as examples. Many other variations are possible. For example, the processing elements of the present invention by the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A system for use with a variable rate irrigation system having at least one irrigation span and a drive system for moving the irrigation span, wherein the drive system comprises at least one drive tower; wherein the system comprises:

a plurality of sprinklers, wherein the sprinklers receive water under pressure and spray the water onto a field to be irrigated;

weather sensors, wherein at least one weather sensor is configured to detect humidity, pressure, precipitation, wind speed and direction, or temperature;

a processing system, wherein the processing system is programmed to execute an irrigation plan; further wherein the processing system monitors a mapped set of boundaries and receives weather data from one or more weather sensors; further wherein the processing system estimates the range of the sprinklers based at least in part on the weather data and on water pressure data;

wherein the range of the sprinklers is the horizontal distance which each sprinkler is able to project a given applicant; and a control system, wherein the control system receives instructions from the processing system and adjusts irrigation system parameters;

a throw module, wherein the throw module calculates the throw length of at least one sprinkler based on inputted data; wherein the throw length is the horizontal distance which the sprinkler is able to project a given applicant;

wherein the inputted data comprises data selected from the group of data comprising: field mapping data, water pressure data and weather data;

wherein the weather data comprises data selected from the group of data comprising wind speed, wind direction, humidity and barometric pressure;

wherein the throw module calculates the throw length for a plurality of sprinklers based at least in part on the received water pressure data and the weather data;

wherein the throw module calculates the throw length for a plurality of water pressures and sprinkler parameters;

wherein the sprinkler parameters are comprised of an angle of travel of the irrigation span;

wherein the throw module calculates the throw length for the plurality of sprinklers based on movement data of the drive tower; wherein the movement data comprises a speed of an irrigation tower;

wherein the control system is configured to change a prescribed route in the irrigation plan based on the detected wind speed and direction; wherein the control system is configured to change a prescribed speed in the irrigation plan based on the calculated throw length for the plurality of sprinklers.

2. The system of claim 1, wherein the throw module calculates the throw lengths for a plurality of sprinklers based at least in part on the group of data comprising: irrigation map data, weather data, and topographical data.

3. The system of claim 2, wherein the throw lengths are calculated based at least in part on the group of data comprising: safety zones, max ET ratio, minimum Arc Radius, full or partial circle, max/min trajectories, and start/end angles.

4. The system of claim 3, wherein the system further comprises an adjustment module; wherein the adjustment module is linked to a control system and is configured to control and regulate water pressure and to adjust sprinkler parameters.

5. The system of claim 4, wherein the adjustment module receives irrigation plan data and location data; further wherein the adjustment module changes a plurality of the sprinkler parameters based at least in part on throw calculations from the throw module; wherein the parameters are changed to reduce the sprinkler throw distances for a first sprinkler to less than the distance between the first sprinkler and each irrigation boundary during the execution of the irrigation plan.

6. The system of claim 5, wherein the sprinkler parameters comprise: trajectory and nozzle/sprinkler settings.

7. The system of claim 6, wherein the system increases water pressure and changes sprinkler parameters when a sprinkler is projecting an applicant against the wind direction.

8. The system of claim 7, wherein the system decreases water pressure and changes sprinkler parameters when a sprinkler of the system is projecting an applicant with the direction of the wind.

9. The system of claim 6, wherein the system changes the route for a given irrigation plan based on the detected wind speed and direction.

10. The system of claim 9, wherein the system comprises a waste module, wherein the waste module calculates the amount of over-spray and the amount of over-applied applicant expected from both an original irrigation plan and an adjusted irrigation plan.

11. The system of claim 9, wherein the waste module is configured to provide a calculation of the different energy costs expected in executing the original irrigation plan and the adjusted irrigation plan.

12. The system of claim 11, wherein the calculation of different energy costs is used by the processor to determine whether to make corrections to the original irrigation plan.

13. The system of claim 12, wherein at least one waste module calculation is displayed to an operator to make determinations regarding which irrigation plan to execute.

14. The system of claim 6, wherein the irrigation system receives and executes a first water distribution plan and a first route of travel based on a first detected set of weather data; and creates a second water distribution plan and a second route of travel based on updated weather data.

* * * * *